(No Model.)

A. G. POINTS.
DINNER PAIL.

No. 281,132. Patented July 10, 1883.

WITNESSES:
W. W. Hollingsworth
A. J. Lyne.

INVENTOR:
Alex. G. Points
By Munn &
ATTORNEYS.

UNITED STATES PATENT OFFICE.

ALEXANDER G. POINTS, OF STAUNTON, VIRGINIA.

DINNER-PAIL.

SPECIFICATION forming part of Letters Patent No. 281,132, dated July 10, 1883.

Application filed May 25, 1883. (No model.)

*To all whom it may concern:*

Be it known that I, ALEXANDER GROVE POINTS, of Staunton, in the county of Augusta and State of Virginia, have invented a new and useful Improvement in Dinner-Pails, of which the following is a full, clear, and exact description, reference being had to the annexed drawings, forming part of this specification.

This invention relates to portable provision chests or pails for the use of workmen, pupils, excursionists, and others; and the invention consists of the novel construction hereinafter described and claimed.

Figure 1:
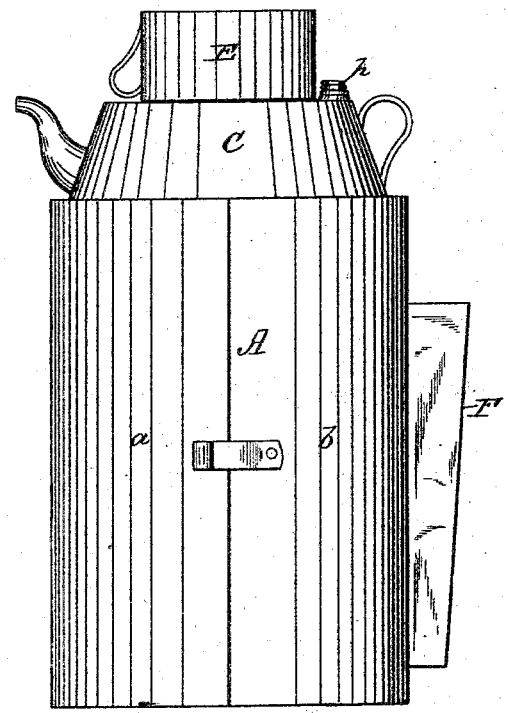
Figure 2:
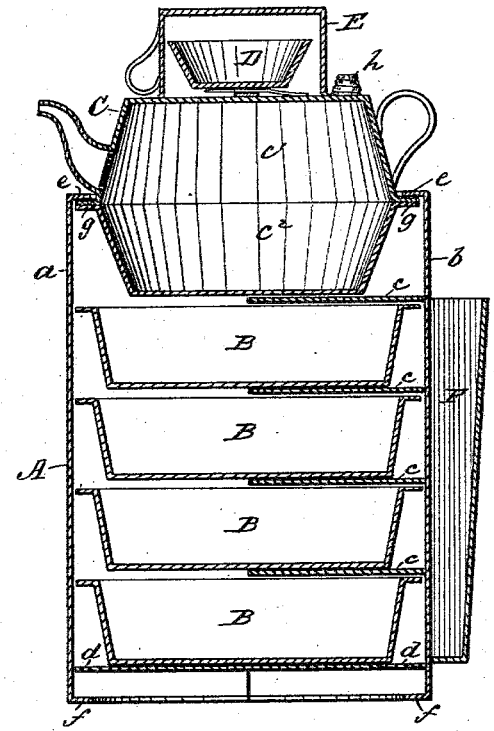
Figure 3:
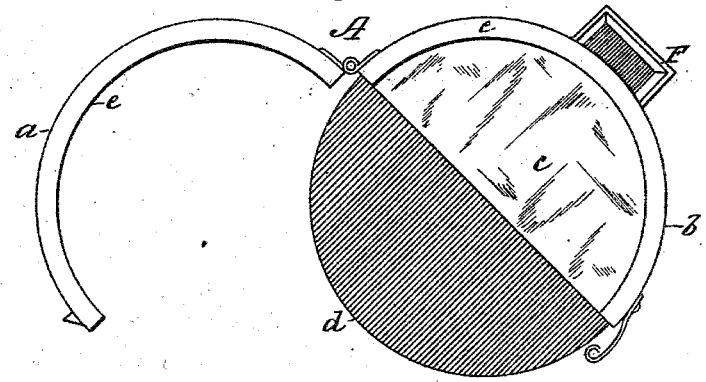

In the drawings, Figure 1 is a side elevation of my invention. Fig. 2 is a vertical section of the same, and Fig. 3 is a plan view of the shelved casing spread open.

A indicates a cylindrical casing formed of two parts, $a\ b$, semicircular in cross-section, and provided with semicircular parallel shelves $c$ and a circular shelf, $d$, near the bottom. The said shelves are rigidly secured to the part $b$, and the part $a$ is hinged to the latter in such manner as to close the casing and conceal the shelves.

B indicates a series of pans, which are of such a height that when inserted between the shelves severally they will be held in a horizontal position by contact therewith. The bottom shelf, $d$, forms the bottom of the casing. The upper and lower edges of the parts $a\ b$ are provided with inwardly-turned flanges $e f$, the latter to serve as a base for the chest or pail, and the former to serve as guards for the circular flange $g$ around the tea-kettle C, which forms the top of the pail. The tea-kettle C, or coffee-pot, as may be preferred, is formed of two sections, $c'\ c^2$, having flanges which are soldered together in such manner as to form the flange $g$. The tea-kettle is supported on the top shelf, $c$, while the flanges $e$, which overlap the flange $g$, prevent the kettle from being displaced accidentally. The kettle is formed with a plane upper surface, at one edge of which is an opening covered by a screw-cap, $h$. The opening is for filling the kettle, and the plane surface serves as a base for a butter-dish, D, while the latter is covered by an inverted cup, E. The bottom of the butter-dish may be provided with a suitable cleat for receiving a metallic strip secured to the upper surface of the kettle, in order to form a connection between said parts to hold the dish in place.

To the outer surface of one of the parts $a\ b$ of the casing is attached a pocket, F, for knives and forks.

What I claim is—

1. The dinner-pail or provision-chest having the cylindrical casing formed of hinged parts $a\ b$, and the semicircular shelves $c$, and circular bottom shelf, $d$, and means for fastening the parts $a\ b$ to close the casing, substantially as shown and described.

2. The combination of the cylindrical casing formed of hinged parts $a\ b$, one of which is provided with shelves $c\ d$, the pans adapted to be held between the shelves, and the kettle or pot having flange $g$, adapted to be held by flanges $e$ at the top of the casing, substantially as specified.

ALEX. GROVE POINTS.

Witnesses:
JNO. B. HOGE,
A. W. TAYLOR.